(12) United States Patent
Delorme et al.

(10) Patent No.: US 9,510,242 B2
(45) Date of Patent: Nov. 29, 2016

(54) REDUCING SUPERFLUOUS TRAFFIC IN A NETWORK

(71) Applicant: NVIDIA Corporation, Santa Clara, CA (US)

(72) Inventors: Flavien Delorme, Sophia Antipolis (FR); Fabien Besson, Sophia Antipolis (FR); Bruno De Smet, Sophia Antipolis (FR)

(73) Assignee: Nvidia Corporation, Santa Clara, CA (US)

( * ) Notice: Subject to any disclaimer, the term of this patent is extended or adjusted under 35 U.S.C. 154(b) by 49 days.

(21) Appl. No.: 13/896,542

(22) Filed: May 17, 2013

(65) Prior Publication Data

US 2014/0341028 A1 Nov. 20, 2014

(51) Int. Cl.
*H04W 28/10* (2009.01)
*H04L 12/801* (2013.01)
*H04L 12/823* (2013.01)

(52) U.S. Cl.
CPC ............ *H04W 28/10* (2013.01); *H04L 47/193* (2013.01); *H04L 47/32* (2013.01)

(58) Field of Classification Search
CPC .................... H04L 12/40097; H04L 29/0608; H04L 29/06163; H04L 47/32; H04W 52/02
USPC ................ 370/235, 229, 230, 328, 338, 477
See application file for complete search history.

(56) References Cited

U.S. PATENT DOCUMENTS

| | | | |
|---|---|---|---|
| 6,208,620 B1* | 3/2001 | Sen et al. ....................... | 370/231 |
| 2004/0052234 A1* | 3/2004 | Ameigeiras et al. ......... | 370/338 |
| 2012/0176898 A1* | 7/2012 | Ehsan et al. ................... | 370/232 |
| 2014/0064095 A1* | 3/2014 | Li ........................... | H04L 47/32 |
| | | | 370/236 |

* cited by examiner

*Primary Examiner* — Gary Mui
*Assistant Examiner* — Stephen Steiner (57) ABSTRACT

In one embodiment the modem has a network interface, application interface, processor, and memory. The network interface exchanges radio data with a network. The application (or host) interface exchanges application data with an application (or host) processor. The processor converts a unit of radio data to a corresponding unit of application data. The memory stores each unit of application data received by the modem. The processor is configured to execute a selective discard function to reduce traffic by determining if a newly arrived unit of application data is a duplicate of a stored unit of application. In the case that the newly arrived unit of application data is a duplicate of the stored unit of application data, the processor is further configured to selectively discard the duplicate unit of application data in dependence on whether an acknowledgement of the data has been already recognized by the processor.

7 Claims, 6 Drawing Sheets

REDUCING SUPERFLUOUS TRAFFIC IN A NETWORK

TECHNICAL FIELD

This invention relates to a modem and a method implemented in a modem for reducing superfluous traffic in a wireless network.

BACKGROUND

Figure 1:
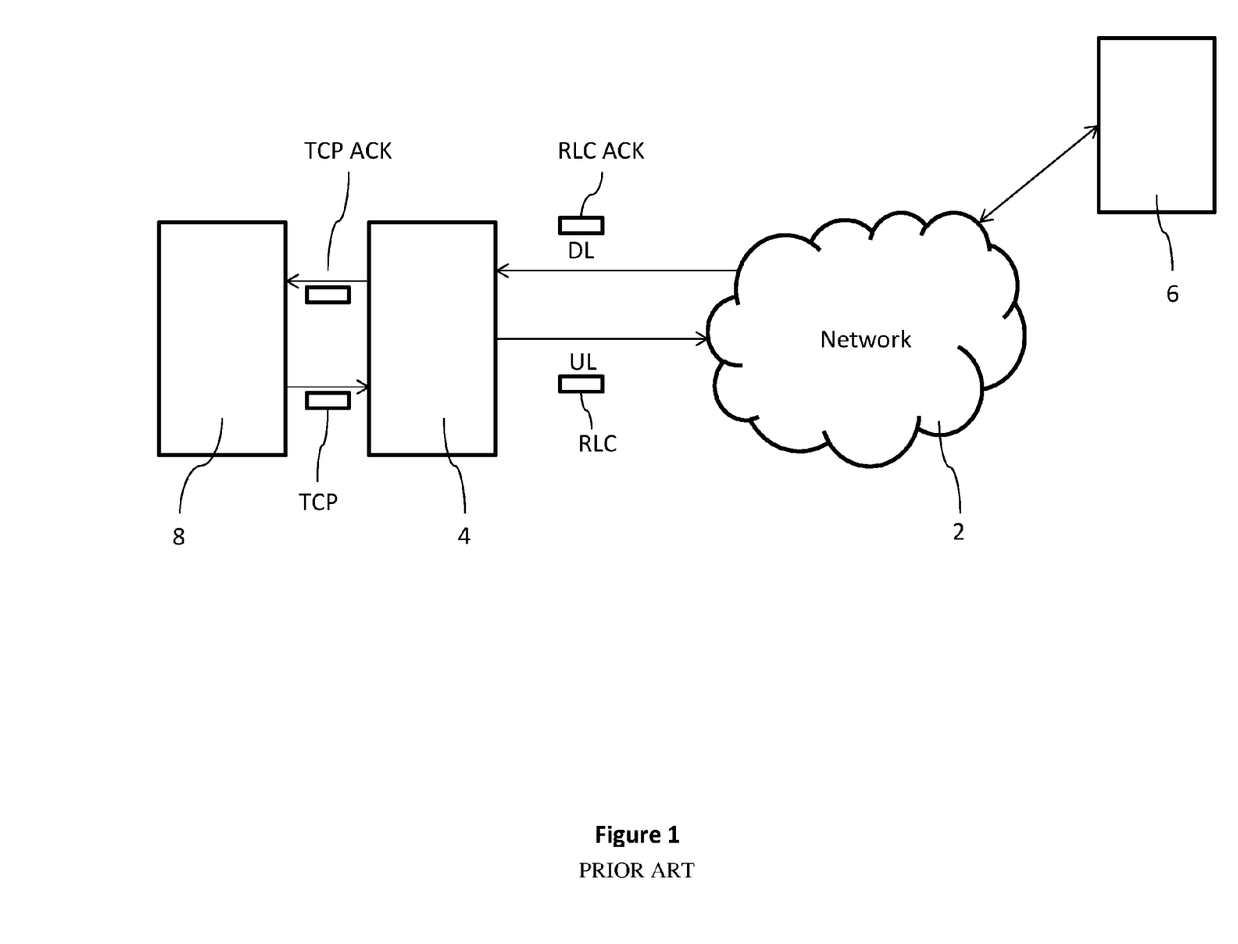
FIG. 1 is a schematic block diagram of two mobile devices communicating over a network.

FIG. 1 is a schematic block diagram of devices communicating over a wireless network 2. A computer device 4 in the form of a mobile terminal communicates with another computer device 6, similarly in the form a mobile terminal. Communication is over the wireless network 2. The mobile terminal 4 operates to establish a communication session with the mobile terminal 6 according to a wireless access technology (for example 2G, 3G, LTE (long term evolution)). According to the appropriate wireless access technology, once a communication session has been established, packets of data can be transmitted at the radio link control level (RLC packets). FIG. 1 shows an RLC packet being transmitted from the mobile terminal 4 on the uplink UL to the network 2, and an RLC acknowledgement packet RLC Ack received from the network 2 on the downlink DL to the mobile terminal 4. These packets are conveyed over a radio bearer at the packet switch layer 2 of the third generation partnership protocol (3GPP).

Data to be transmitted over the packet switch layer 2 can arrive at the mobile terminal 4 from a separate host or application processor 8. For example, the host terminal 8 may take the form of a desktop computer, laptop computer, tablet style computer, etc. The mobile terminal 4 is connected to the application processor 8 in any suitable manner, for example, by a wired (e.g., USB) or wireless connection. For example, the mobile terminal 4 may include a modem and may take the form of a dongle for plugging into the application processor.

The application processor generates data in the form of transport control protocol/internet protocol packets (TCP IP packets). A TCP packet is shown being delivered from the application processor 8 to the mobile terminal 4, and a TCP acknowledgement package TCP Ack is shown as being returned from the mobile terminal 4 to the application processor 8. In the case of acknowledgements, these are generated by the end device 6 or possibly an intermediate entity within the network 2. An RLC acknowledgement is generated by packet switch layer 2, and a TCP acknowledgment is generated by a transport control protocol layer at the end device 6 or intermediate entity (not shown).

As will be evident from FIG. 1, TCP data is delivered to the network over RLC packets. In most cases, each unit of TCP data (for example a packet) will correspond to a unit (for example a packet) of RLC data.

During the TCP data transmission, some packets may be lost or abnormally delayed due to various reasons (for example network congestion, data corruption, routing issues etc.). When this occurs, the sender will notice that the data has not been acknowledged within a certain time out and would attempt to retransmit the data. However, in some cases, the data may simply have been delayed and a premature timeout may occur. This causes unnecessary retransmissions and disturbs the round trip time calculated for the TCP transmission.

In a particular case for a TCP transmission over a 3GPP network, the data may be delayed due a temporary loss of service or bad network conditions.

In the uplink direction, duplicate TCP packets can be retransmitted from the application processor 8 towards the end device 6. On the downlink, duplicate TCP packets which were transmitted by the end device 6 as retransmissions can be received at the application processor 8.

SUMMARY

One aspect provides a modem. In one embodiment the modem has a network interface, application interface, processor, and memory. The network interface exchanges radio data with a network. The application (or host) interface exchanges application data with an application (or host) processor. The processor converts a unit of radio data to a corresponding unit of application data. The memory stores each unit of application data received by the modem. The processor is configured to execute a selective discard function to reduce traffic by determining if a newly arrived unit of application data is a duplicate of a stored unit of application. In the case that the newly arrived unit of application data is a duplicate of the stored unit of application data, the processor is further configured to selectively discard the duplicate unit of application data in dependence on whether an acknowledgement of the data has been already recognized by the processor.

Another aspect provides a method. In one embodiment the method is a method of reducing traffic transmission by a modem to a host processor. The method comprises: receiving a unit of data over a wireless interface configured for coupling to a wireless network; determining if the received unit of data is a duplicate of an earlier received unit of data; and determining if an acknowledgement of the earlier received unit of data has been received from the host processor by the modem for transmission over the wireless interface. If the acknowledgement has been received from the host processor, the method continues with discarding the unit of data without forwarding it to the host processor.

Another aspect provides another method. In one embodiment, the method is a method of reducing traffic transmitted by a modem to a network. The method comprises receiving units of data in a protocol layer over a host interface configured for coupling to a host computer. For each unit of data to be transmitted to a network, the method further comprises converting the unit of data to a radio layer data unit. The method further comprises determining if each received unit of data is a duplicate of an earlier received unit of data. If each received unit of data is a duplicate of an earlier received unit of data, the method further comprises determining if an acknowledgement of the earlier received unit of data has been received by the modem from the network as a radio layer acknowledgement. If no radio layer acknowledgement has been received, the method further comprises discarding the unit of data without forwarding to the network.

BRIEF DESCRIPTION OF THE DRAWINGS

Reference is now made to the following descriptions taken in conjunction with the accompanying drawings, in which.

DETAILED DESCRIPTION

It is recognized that it would be useful to reduce the amount of retransmissions on the uplink and/or downlink to reduce superfluous traffic between the application processor 8 and the mobile terminal 4, and/or between the mobile terminal 4 and the network 2.

Embodiments described herein provide a modem. The modem has a network interface for exchanging radio data with a network and an application (or host) interface for exchanging application data with an application (or host) processor. A modem processor is configured to convert a unit of radio data to a corresponding unit of application data. The modem has a memory storing each unit of application data received by the modem.

The processor is configured to execute a selective discard function to reduce traffic by determining if a newly arrived unit of application data is a duplicate of a stored unit of application data and in the case that it is a duplicate selectively discarding the duplicate unit of application data in dependence on whether an acknowledgement of the data has been already recognized by the processor.

The aim of embodiments discussed herein is to avoid unnecessary TCP data retransmissions whenever possible. In the context of the background referred to above, it is recognized that independently from the access technology TCP transfers are usually performed over acknowledged radio bearers, and thus data is also acknowledged at the RLC level.

A solution is provided to reduce the amount of retransmissions on the uplink (modem to network direction) by detecting that a TCP packet has been retransmitted by the application processor 8 before an RLC acknowledgement has been received. In that case, the TCP retransmission is useless because the application processor could not possibly have had the opportunity to receive a TCP acknowledgement (because the RLC acknowledgement has not yet been received). When this scenario occurs, retransmitted packets can simply be discarded.

Figure 2:
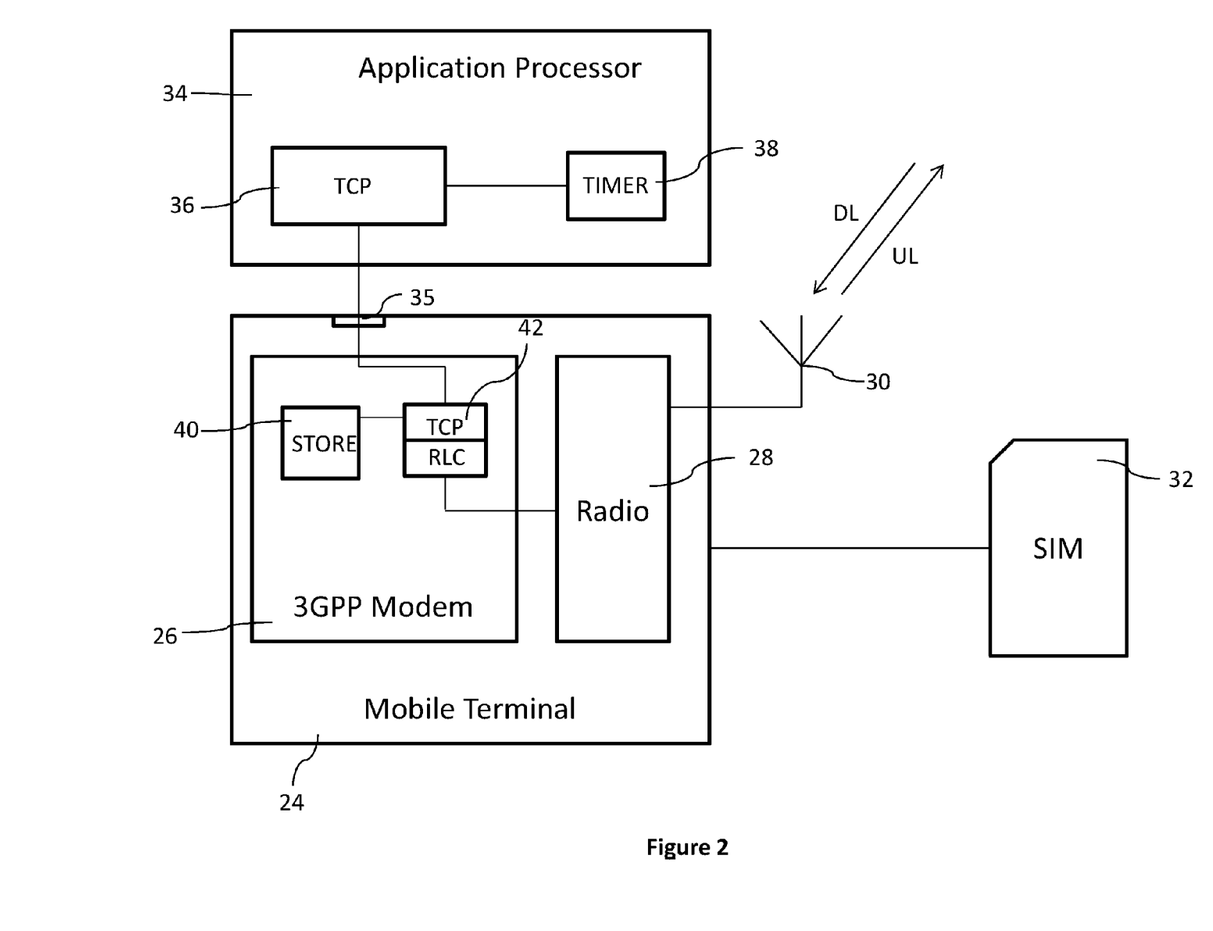
FIG. 2 is a schematic block diagram of a mobile terminal communicating with an application processor.

FIG. 2 is a schematic block diagram of circuitry for implementing a method of reducing the amount of premature retransmissions on the uplink. FIG. 2 illustrates the mobile terminal 24 which comprises a 3GPP modem 26 connected to a radio processor or chip 28. The radio processor is connected to an antenna 30 for transmitting and receiving radio data in the form of RF wireless signals to the network (not shown in FIG. 2). The modem 26 is connected to an application processor 34 over an interface 35. The interface operates at the transport control protocol/IP level and receives and transmits TCP packets between the modem and the application processor. The application processor 34 includes a TCP packeting function 36. The application processor 34 also includes a timer 38 for controlling retransmissions of TCP packets.

The modem 26 has a processor which is effective to control operations of the modem, and in particular, to convert between the TCP layer and RLC layer (packet switch layer 2) so that units of data received as TCP packets can be transmitted as a RLC packets in the form of RF signals via the radio processor 28. On the downlink, units of data coming in the RLC packets can be converted into TCP packets for transmission over the interface 35 to the application processor 34.

The modem 26 includes a store 40 which holds TCP packets received at the modem. Thus the store 40 holds TCP packets arriving from the application processor 34, TCP acknowledgements arriving from the application processor 34, TCP packets transported by incoming RLC data and TCP acknowledgments transported by incoming RLC data where incoming refers to the downlink direction.

Each packet has a unique identifier which identifies the transaction to which it is connected—this allows acknowledgements to be associated with packets, and further allows packets at the RLC level to be associated with TCP packets with the same data. The unique identifier enables the processor to know which TCP packet is acknowledged at RLC level. Also a newly received TCP packet would be considered as a retransmission of an already stored packet if it is same packet TCP header+Data. I.e., retransmission is not only based upon the unique identifier in the form of for example, TCP sequence number. When the modem detects a TCP retransmission (same TCP header and Data), if initial transmission has been acknowledged at RLC level, then TCP retransmission is sent again to the RLC layer as if it was a different packet. If RLC did not yet acknowledge the initial transmission, then the TCP retransmission is discarded.

Figure 3:
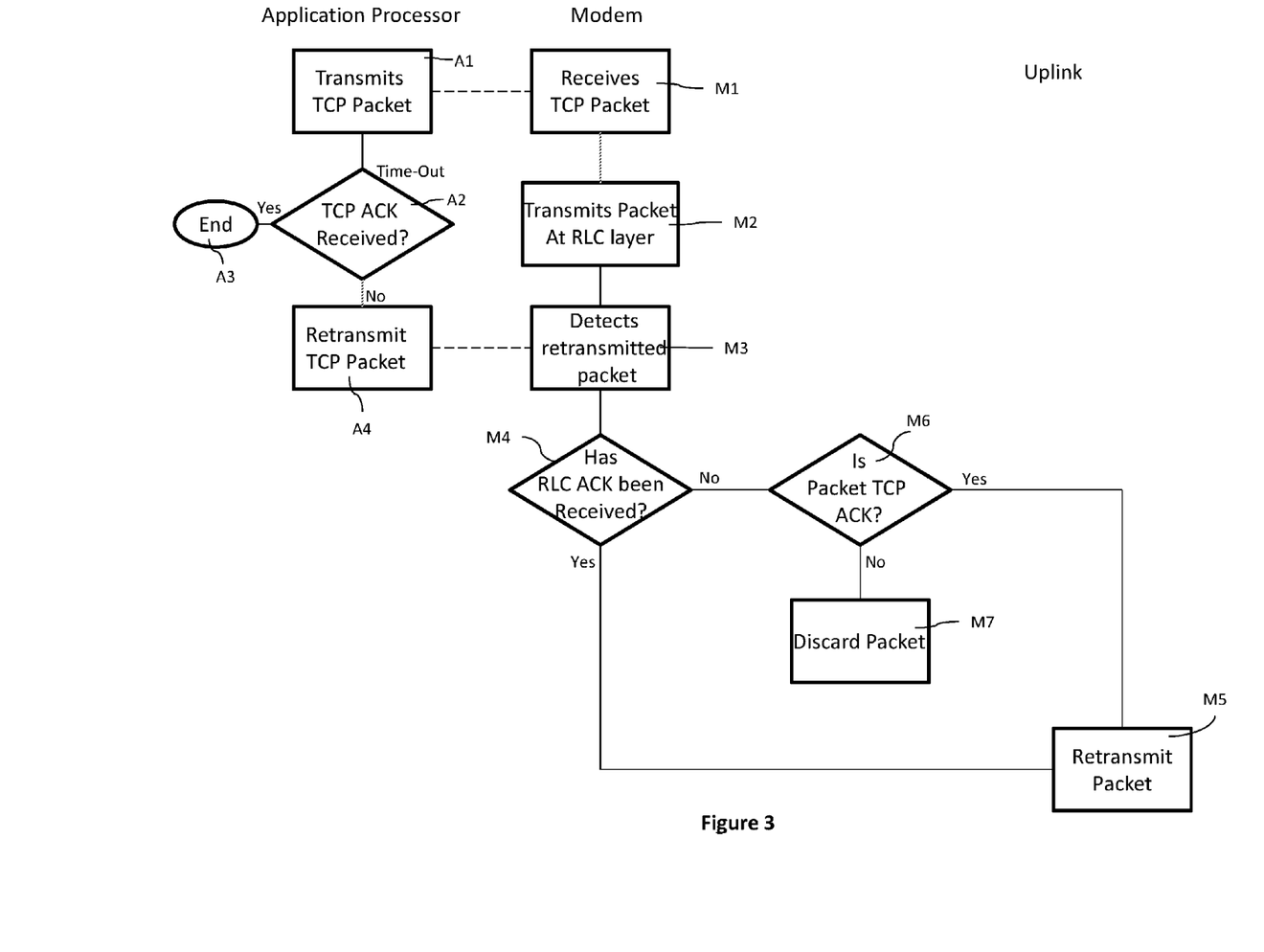
FIG. 3 is a flow chart of a method of reducing superfluous transmissions on the uplink.
Figure 4:
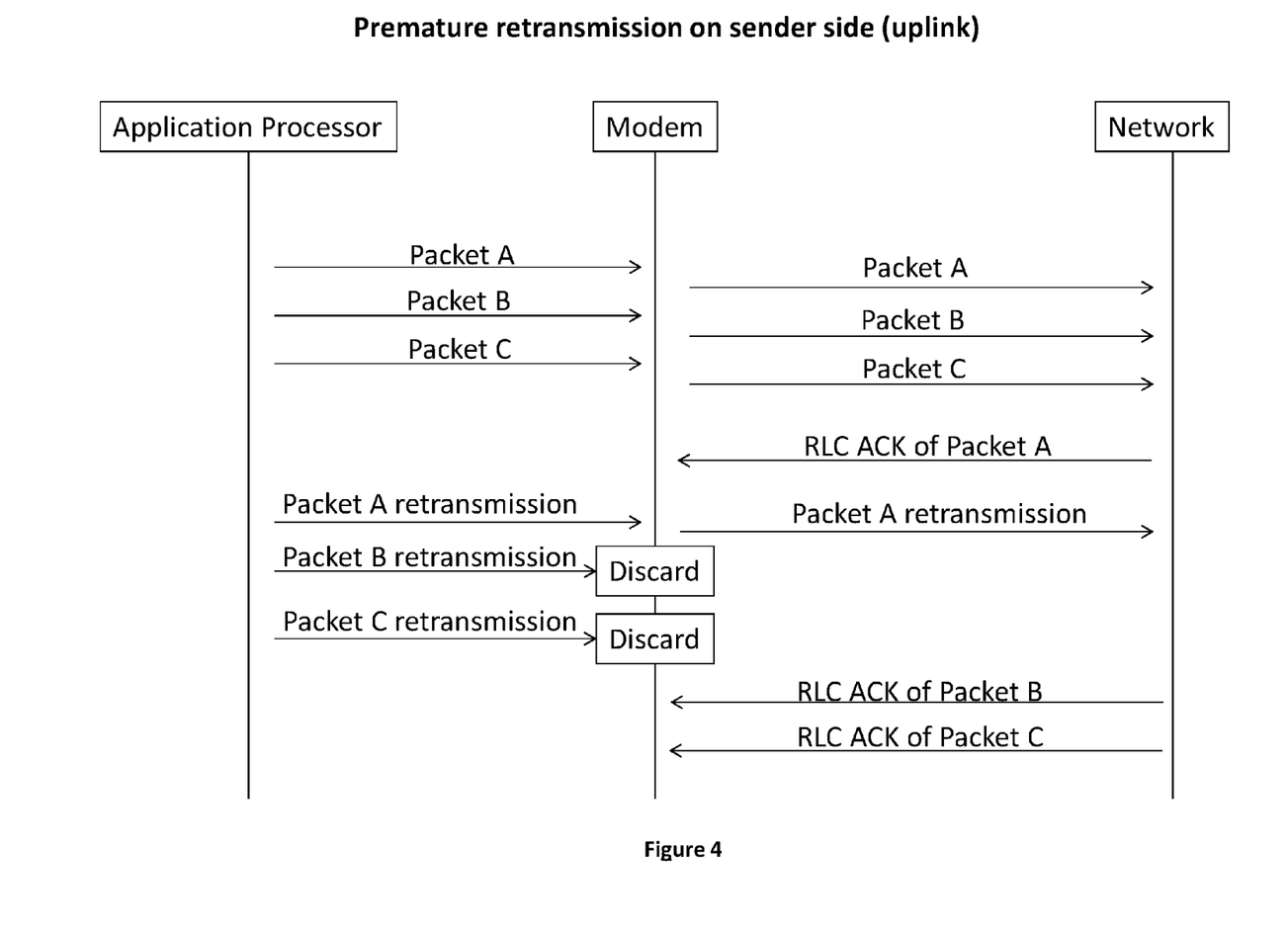
FIG. 4 is a packet flow diagram for reducing transmissions on the uplink.

A method of reducing superfluous retransmissions on the uplink will now be described with reference to FIGS. 3 and 4. On the left hand side of FIG. 3, the steps carried out by the application processor are indicated. At step A1, the application processor transmits a TCP packet. A timeout function is instigated, after which at step A2 the application processor determines whether or not a TCP acknowledgement has been received. If it has, the process ends at A3. If it has not, the application processor retransmits the same TCP packet (A4). In FIG. 4, these are illustrated as packets A, B, C with the retransmission steps after the timeout period also illustrated. In this case, it is assumed that no TCP acknowledgements for packets A, B, or C have been received at the application processor within the timeout period.

The steps at the modem begin at step M1 where the modem receives the TCP packet. At M2, the modem transmits the packet at the RLC layer. At step M3, the modem detects the retransmitted TCP packet transmitted at step A4 of the application processor flow.

At this point, embodiments described herein introduce the step M4 to determine whether or not an RLC Ack has been received for the originally transmitted packet. Referring to FIG. 4, the modem checks whether RLC Ack for packet A has been received. If it has been received, at step M5, the modem operates the radio processor 28 to transmit the retransmitted TCP packet over an RLC packet on the uplink.

If the check at M4 indicated that the RLC Acks have not been received, a further check is made to determine whether or not the packets are data or acknowledgements (M6). If they are not acknowledgements, the packets are discarded (M7). If they are acknowledgements, they are retransmitted. In this way, the method of selectively discarding TCP packets applies only to TCP packets containing data. Pure duplicate Ack packets are not filtered as they are occur when missing packets are detected by a receiver and are necessary for a fast retransmission procedure.

Note that in the present application, the term packet is used to denote a unit of TCP or RLC data. However, it will be appreciated that an appropriate unit of data could be frame and that a packet could contain multiple frames.

To implement this mechanism, the modem 26 stores in store 40 all original TCP packets received from the application processor 8 until they are acknowledged at RLC level.

Figure 5:
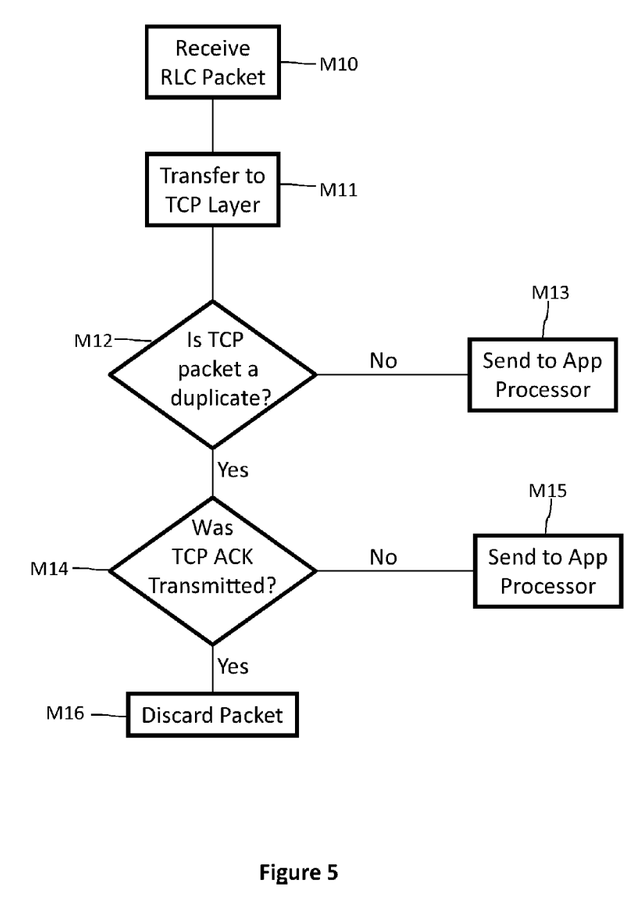
FIG. 5 is a flow chart for a method of reducing transmissions on the downlink.
Figure 6:
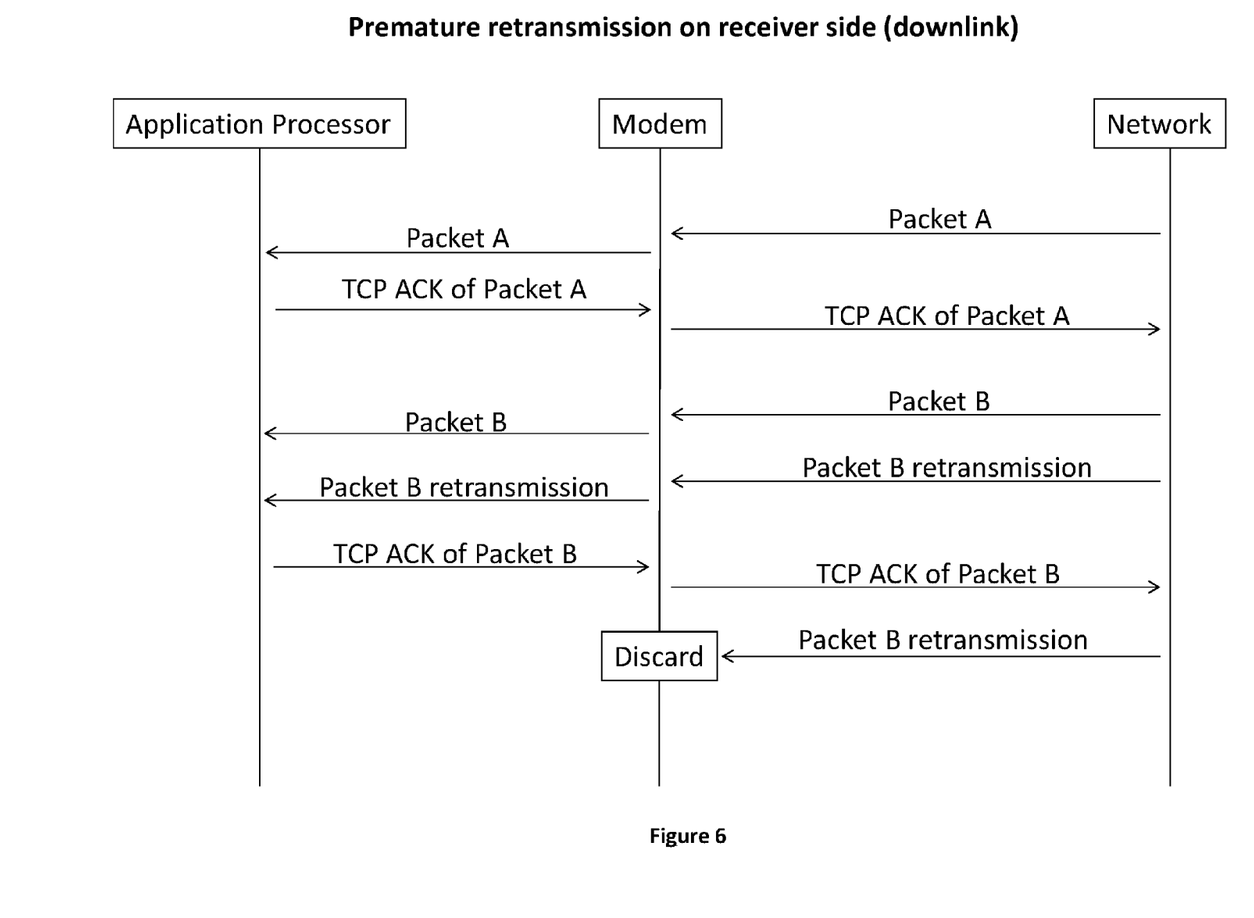
FIG. 6 is a packet diagram for reducing retransmissions on the downlink.

Reference will now be made to FIGS. 5 and 6 to describe a method of reducing the amount of retransmissions in the downlink direction. At step M10 the modem receives an RLC packet. At step M11 it transfers the packet to the TCP layer. At step M12, the TCP packet can now be compared with the packet held in the store 40 to determine whether or not it is a duplicate. This can be done using unique packet identifiers. If it is determined that the TCP packet is not a duplicate, it is sent to the application processor 34 over the interface 35. If it is determined that it is a duplicate, the store 40 is checked to see whether or not TCP acknowledgement has already been received by the modem and stored in the store 40. If an acknowledgement has not been transmitted, the incoming TCP packet is sent to the application processor 8. However, if it is determined that a TCP acknowledgement has already been transmitted, the modem discards the packet at step M16. Referring to FIG. 6, when packet A is received it is determined that it is not a duplicate and sent to the application processor. The application processor generates an acknowledgement which is returned to the modem and transmitted by the modem over the network. When packet B is received, it is determined that it is not a duplicate and transmitted to the application processor 8. Similarly when transmission of packet B is received, although it is determined that it is in this case a duplicate, no acknowledgement has yet been transmitted (step M14), and so it is sent to the application processor 8. At this point, the application processor 8 generates a TCP acknowledgement. Therefore, the subsequent packet B retransmission is discarded by the modem.

Thus, in a similar way to the method on the uplink side, the amount of retransmissions in the downlink direction can reduced. When detecting that the same data has been received several times, although the TCP acknowledgement has been transmitted (indicating that data was not corrupted), this enables determining that the received transmissions were premature and duplicated frames can be discarded without impacting the application processor. The benefit is to reduce data exchange between the application processor and the modem and avoids transmission of duplicate acknowledgements from the uplink direction.

Embodiments operate effectively for both uplink and downlink when the communication between the modem and the application processor 8 is lossless and without corruption.

Hereinbefore it has been assumed that a unit of data at the TCP corresponds to a unit of data at the RLC level, for example, a packet or a frame. However, data is not always segmented the same when being retransmitted over the TCP protocol (from the RLC level). The mechanism described herein works particularly well when the exact same data frame is retransmitted otherwise TCP packets have to be recreated by the modem. However, embodiments can also operate where TCP packets are recreated by the modem based on incoming data at the RLC level.

Those skilled in the art to which this application relates will appreciate that other and further additions, deletions, substitutions and modifications may be made to the described embodiments.

What is claimed is:

1. A method of reducing traffic transmission between a modem of a mobile terminal and a host processor separate from the modem, the method comprising:
   receiving, by the modem from a wireless network via a wireless interface coupled to the wireless network, a unit of data at the radio link control (RLC) level;
   converting, by a processor in the modem, the RLC level unit of data to a transport control protocol (TCP) unit of data;
   determining, by the modem, if the newly arrived TCP unit of data is a duplicate of an earlier received TCP unit of data, wherein, if the newly arrived TCP unit of data is not determined to be a duplicate of the earlier received TCP unit of data, the newly arrived TCP unit of data is sent to the host processor over an interface that is not part of the wireless network;
   if the newly arrived TCP unit of data is determined to be a duplicate of the earlier received TCP unit of data, determining, by the modem, if an acknowledgement of the earlier received TCP unit of data has been received by the modem from the host processor over the interface that is not part of the wireless network, wherein, if the acknowledgement of the earlier received TCP unit of data has not been received by the modem, the newly arrived TCP unit of data is sent to the host processor over the interface that is not part of the wireless network; and
   if the newly arrived TCP unit of data is determined to be a duplicate of the earlier received TCP unit of data and the acknowledgement of the earlier received TCP unit of data has been received by the modem, discarding the newly arrived TCP unit of data.

2. The method according to claim 1, comprising receiving the RLC level unit of data over a radio bearer in a communication session with the network.

3. The method according to claim 1, wherein each newly arrived TCP unit of data is associated with a transaction identifier specific to the newly arrived TCP unit of data and wherein the step of determining if the newly arrived TCP unit of data is a duplicate of the earlier received TCP unit of data comprises comparing the transaction identifier specific to the newly arrived TCP unit of data with a transaction identifier specific to the earlier received TCP unit of data.

4. The method according to claim 3, wherein the step of determining if an acknowledgement of the earlier received TCP unit of data has been received by the modem from the host processor is effected by comparing a transaction identifier specific to the acknowledgement of the earlier received TCP unit of data with the transaction identifier specific to the earlier received TCP unit of data.

5. The method according to claim 1, further comprising storing in a memory of the modem each newly arrived TCP unit of data converted from the received RLC unit of data received by the modem from the wireless network and storing each acknowledgement of TCP units of data received from the host processor for the purposes of the steps of determining if the newly arrived TCP unit of data is a duplicate of the earlier received TCP unit of data and determining if the acknowledgement of the earlier received TCP unit of data has been received by the modem from the host processor.

6. A wireless mobile terminal including a modem, the modem having:
   a network interface for exchanging radio link control (RLC) units of data with a wireless network;

an application interface, that is not part of the network interface, for exchanging transport control protocol (TCP) units of data with a host processor external to the modem;

a processor for converting an RLC unit of data to a corresponding TCP unit of data and for converting a TCP unit of data to a corresponding RLC unit of data; and a memory storing each TCP unit of data received by the modem from the host processor over the application interface;

wherein the processor is configured to selectively discard TCP units of data to reduce traffic between the host processor and modem and between the wireless network and modem by determining if a newly arrived TCP unit of data from the host processor is a duplicate of a stored TCP unit of data such that if the newly arrived TCP unit of data is a duplicate of a stored TCP unit of data selectively discarding the newly arrived TCP unit of data if an acknowledgement of a transmitted RLC packet corresponding to the stored earlier transmitted TCP unit of data has not been received by the modem from the wireless network over the network interface.

7. The modem according to claim 6, wherein the processor is configured to reduce traffic between the host processor and modem by selectively discarding the newly arrived TCP unit of data from the host processor by determining if the newly arrived TCP unit of data has a same transaction identifier as a transaction identifier specific to an acknowledgement of an earlier generated same TCP unit of data.

\* \* \* \* \*